United States Patent [19]

Nelson

[11] Patent Number: 5,147,653
[45] Date of Patent: Sep. 15, 1992

[54] DIRECTED FIBER PREFORMING

[75] Inventor: Gullmar V. Nelson, Durham, N.H.

[73] Assignee: Dadison Textron Inc., Dover, N.H.

[21] Appl. No.: 792,658

[22] Filed: Nov. 15, 1991

[51] Int. Cl.⁵ ............................. B28B 13/00
[52] U.S. Cl. ......................... 425/470; 156/62.2; 156/382; 65/4.4; 65/9
[58] Field of Search ............ 65/4.4, 9; 425/470, 425/85; 156/382, 62.2, 62.4

[56] References Cited

U.S. PATENT DOCUMENTS

| | | | |
|---|---|---|---|
| 3,170,197 | 2/1965 | Brenner | 65/4.4 X |
| 3,428,518 | 2/1969 | Schafer | 156/62.2 X |
| 4,061,485 | 12/1977 | Rimmel | 65/4.4 |
| 4,496,384 | 1/1985 | Lin | 65/4.4 |
| 5,022,838 | 6/1991 | Payne | 425/470 X |

Primary Examiner—Robert L. Lindsay
Attorney, Agent, or Firm—Reising, Ethington, Barnard, Perry & Milton

[57] ABSTRACT

A fiber placement control apparatus for selectively directing a stream of fiber onto a stationary preform screen, including a rigid, straight fiber delivery tube communicating from a conventional chopper/blower assembly. A first set of four circumferentially equally spaced nozzles adjacent the exit end of the tube directs a binder into the stream of fibers, and a second set of four circumferentially equally spaced nozzles positioned downstream of the first set directs air onto the stream. By selectively operating any three of the air nozzles, the direction of the stream toward the preform screen is controlled. A conventional multidirectional gantry head may serve to move the rigid delivery tube vertically, left and right, and relative to the screen.

7 Claims, 2 Drawing Sheets

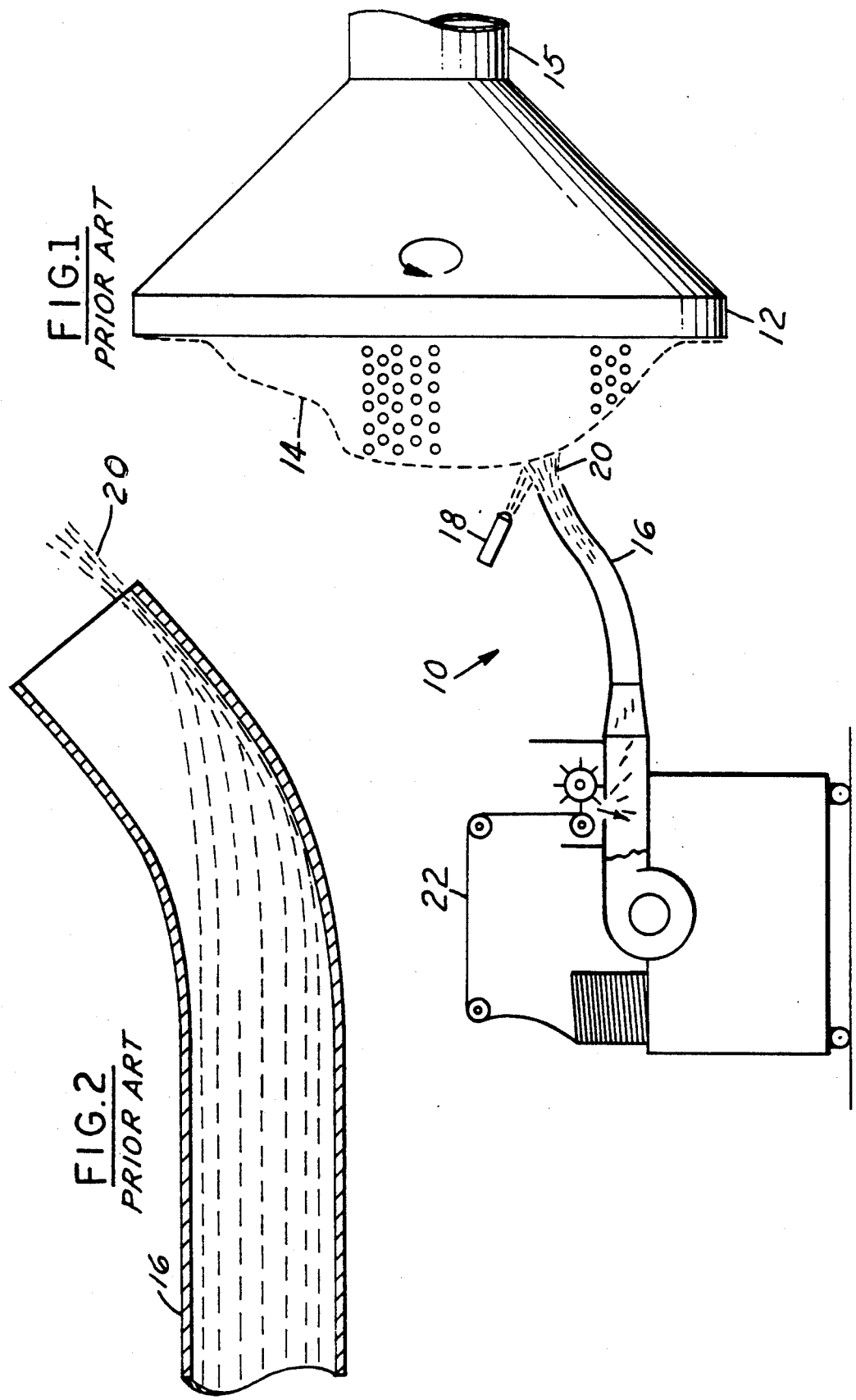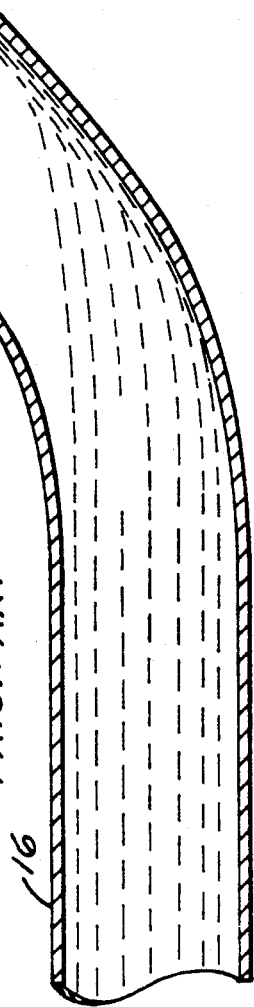

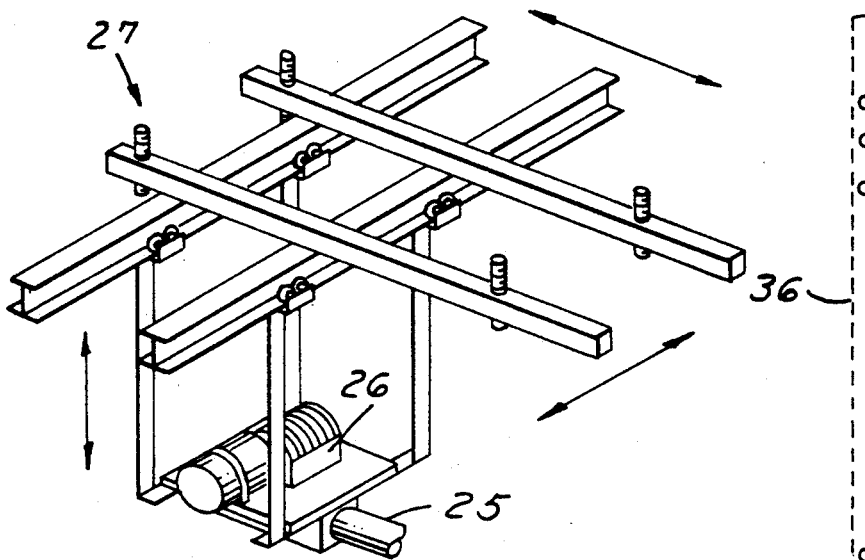
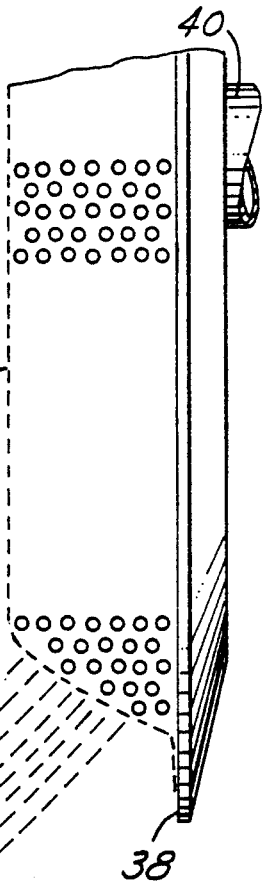
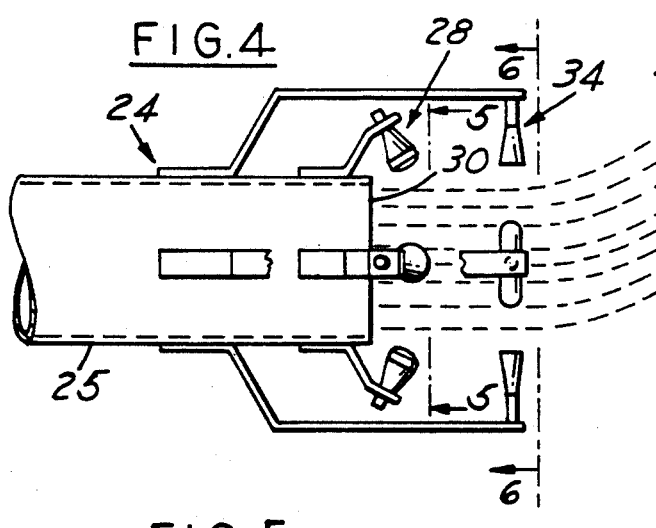
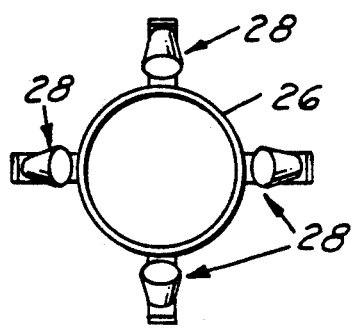
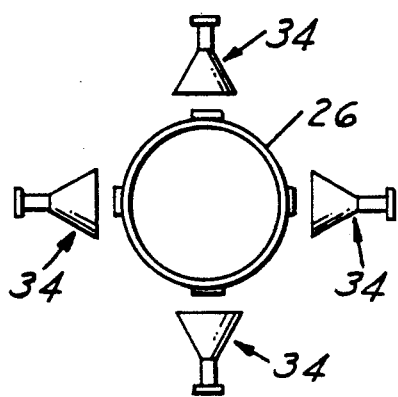

DIRECTED FIBER PREFORMING

TECHNICAL FIELD

This invention relates generally to directed fiber preforming and, more particularly, to glass fiber placement control for directed fiber preforming in a variable distribution pattern.

BACKGROUND ART

Craig U.S. Pat. No. 3,363,036 discloses a method of forming a fiber mat, wherein the air jets used therein are for the purpose of obtaining a random, uniform distribution of chopped fibers across a mat, rather than to control the direction of fiber distribution onto a complex shaped part. The air is always on-for the dispersion function, rather than to control.

Rimmel U.S. Pat. No. 4,061,485 discloses a method of controlling the distribution of fibers on a receiving surface, wherein the air is pulsed in a fixed, repeating sequence, which is adjustable, rather than controlling the amount deposited or varying the direction to achieve a varying distribution pattern.

Lin U.S. Pat. No. 4,496,384 discloses a method for producing a continuous glass filament mat, wherein the air is a carrier only, rather than a mean for controlling the direction of the fiber distribution. The air stream and the fibers in the air stream are directed and controlled by the side walls in the distribution device which employs the Coanda effect.

Mosnier U.S. Pat. No. 4,594,086 discloses a method for distribution of fibers in a felt, wherein the air is used to carry the fibers to the receiving screen, and to aid in achieving a uniform distribution on a flat mat, rather than in a non-uniform manner.

DISCLOSURE OF THE INVENTION

A general object of the invention is to provide an improved apparatus for directing fiber distribution on a complex, three dimensional preform screen in a predetermined variable controlled pattern.

Another object of the invention is to provide a control system for placing fibers in those locations on a preform as required to achieve the desired strength and performance of the molded part, minimizing the cost and weight of the molded part.

A further object of the invention is to provide a system for controlling a plurality of air and binder spray nozzles, coupled with a conventional chopper/blower assembly which is also controlled to vary the rate of chopping fibers, and a moving means therefor, such as a multi-directional gantry head, for moving the fiber delivery tube in all selected directions.

Still another object of the invention is to provide a control system wherein the preform screen is mounted in a stationary horizontal position, the delivery tube from the chopper/blower assembly is a rigid tube, and a first set of four binder spray nozzles and a second set of directional air control nozzles are mounted in series adjacent the exit of the delivery tube.

A still further object of the invention is to provide a fiber placement control apparatus wherein a stream of fibers is directionally controlled by the selective operation of three of four circumferentially equally spaced air nozzles downstream of the exit of a rigid tube communicating from a fiber chopper/blower assembly.

BRIEF DESCRIPTION OF THE DRAWINGS

FIG. 1 is a schematic view of a prior art directed fiber preform structure;

FIG. 2 is a fragmentary, enlarged side elevational view of a portion of the FIG. 1 structure, illustrating a phenomenon of the prior art;

FIG. 3 is a perspective view of a drive mechanism for use with the invention;

FIG. 4 is a schematic view of the inventive structure;

FIG. 5 and 6 are cross-sectional views taken along the planes of the lines 5—5 and 6—6, respectively, of FIG. 4, and looking in the directions of the arrows.

BEST MODE OF CARRYING OUT THE INVENTION

The prior art arrangement 10 of FIG. 1, includes a rotating table 12 for holding a preform screen 14 backed up by a suction fan 15, a flexible hose 16 and an adjacent binder spray nozzle 18, for directing a stream of glass fiber, represented as 20, from a chopper/blower assembly 22, onto the rotating preform screen 14.

Referring now to FIGS. 3 and 4, there is illustrated a glass fiber placement control system 24, including a rigid delivery tube 25 communicating from a chopper/blower assembly 26 mounted on a gantry system, represented at 27, a set of a plurality of circumferentially equally spaced binder spray nozzles 28 mounted around and just beyond the exit end 30 of the delivery tube 25, to spray binder into the stream of glass fiber, represented as 32, coating the fibers. A second set of a plurality of circumferentially equally spaced directional air control nozzles 34 is mounted just downstream of the set of binder spray nozzles 28.

A preform screen 36 is fixedly mounted on a screen frame 38 a variable distance downstream of the set of directional air control nozzles 34, controlled by an integrated computer control system (not shown). Air suction means, represented as 40, is mounted downstream of the screen frame 38.

As illustrated in FIGS. 5 and 6, each of the sets 28 and 34 of nozzles includes four nozzles.

In the prior art arrangement 10, while some degree of fiber placement control is achieved by moving the flexible hose 16 to direct the stream of fibers 20, the degree of control is limited since the hose 16 is generally quite stiff and can only be flexed a limited amount. As such, when the hose 16 is straight, the fibers 20 are distributed uniformly through the cross-section thereof. However, as illustrated in FIG. 2, when the hose 16 is flexed, the distribution pattern is changed, varying with the degree of bend.

In the FIG. 4 structure, with the stationary preform screen 36 and the rigid delivery tube 25, the four binder spray nozzles 28 serve to deliver binder to the stream of glass fibers 32 while preventing any overspray onto the directional air control nozzles 34. The latter four nozzles direct air in a predetermined sequence onto the stream 32 to control the direction thereof.

At any time that the direction of the fiber stream 32 is to be changed, a selected three of the four nozzles 34 would be in operation to redirect the fiber stream, as when it is desired to direct the stream onto a sloped, rather than a flat or normal, surface, such as shown in FIG. 4.

Vertical, left and right, and fore-and-aft movement of the delivery tube 25 is controlled by the conventional multi-directional gantry system 27 and suitable drive means (not shown), operatively connected to the chopper/blower assembly 26. The speed of the latter assembly, i.e., the amount of fibers being therefor chopped per unit time, and the rate of travel of the gantry head in its various directions may be controlled by a computer (not shown).

INDUSTRIAL APPLICABILITY

It should be apparent that the invention provides an improved structure for distributing binder coated glass fibers to a screen in a variable controlled distribution pattern, by virtue of selectively variably operating three of four circumferentially equally spaced directional air control nozzles to direct air onto the stream of fibers to control the direction of the latter.

It should also be apparent that the size of the chopper/blower assembly could be reduced and mounted on a robot, instead of the illustrated gantry system.

It should be further apparent that the blower could be permanently mounted in back of a chopper unit, and connected thereto by a flexible hose.

While but one embodiment of the invention has been shown and described, other modifications thereof would be possible within the scope of the following claims.

The embodiment of the invention in which an exclusive property or privilege is claimed are defined as follows:

1. For use with a chopper/blower assembly and moving means therefor, a fiber placement control apparatus comprising a rigid fiber delivery tube communicating from the chopper/blower assembly to deliver a stream of fibers therethrough, a first set of circumferentially equally spaced nozzles positioned adjacent the exit end of the delivery tube for directing a binder into the stream of fibers, a preform screen, and a second set of circumferentially equally spaced nozzles positioned downstream of said first set of nozzles adapted to being selectively operated to direct air onto the stream of fibers to variably control the distribution pattern of the fibers onto the stationary preform screen.

2. The fiber placement control apparatus described in claim 1, and a suction fan positioned behind the stationary preform screen.

3. The fiber placement control apparatus described in claim wherein said first set of circumferentially equally spaced binder spray nozzles includes four nozzles.

4. The fiber placement control apparatus described in claim 1, wherein said second set of circumferentially equally spaced directional air control nozzles includes four nozzles, adapted such that selective operation of any three thereof serves to direct the stream of fibers onto selected surfaces of said preform screen.

5. The fiber placement control apparatus described in claim 1, wherein the delivery tube and two sets of nozzles are movable vertically, left and right, and fore-and-aft by said moving means.

6. The fiber placement control apparatus described in claim 5, wherein said moving means includes a gantry system and drive means therefor.

7. The fiber placement control apparatus described in claim wherein the fibers are glass fibers.

* * * * *